Figure 38:
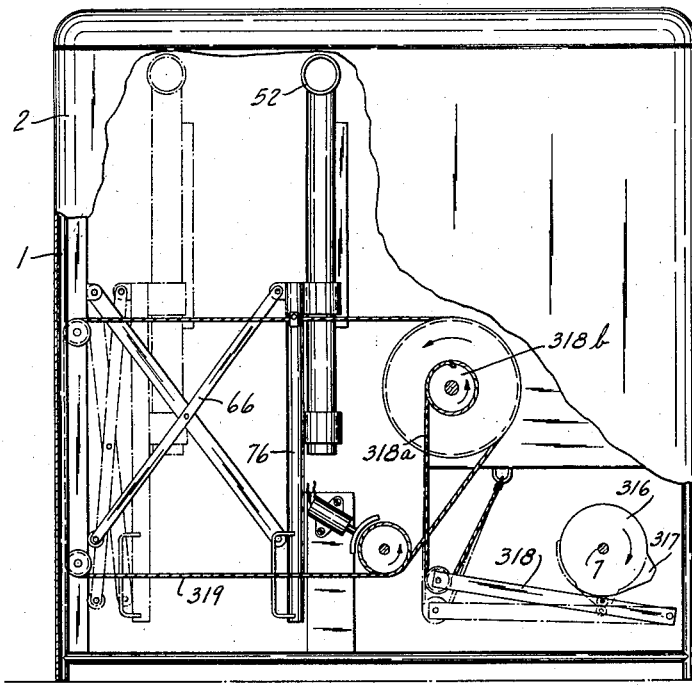

Aug. 18, 1959     D. L. STANLEY     2,899,988
ICE CREAM DISPENSERS
Filed April 12, 1957                          15 Sheets-Sheet 1
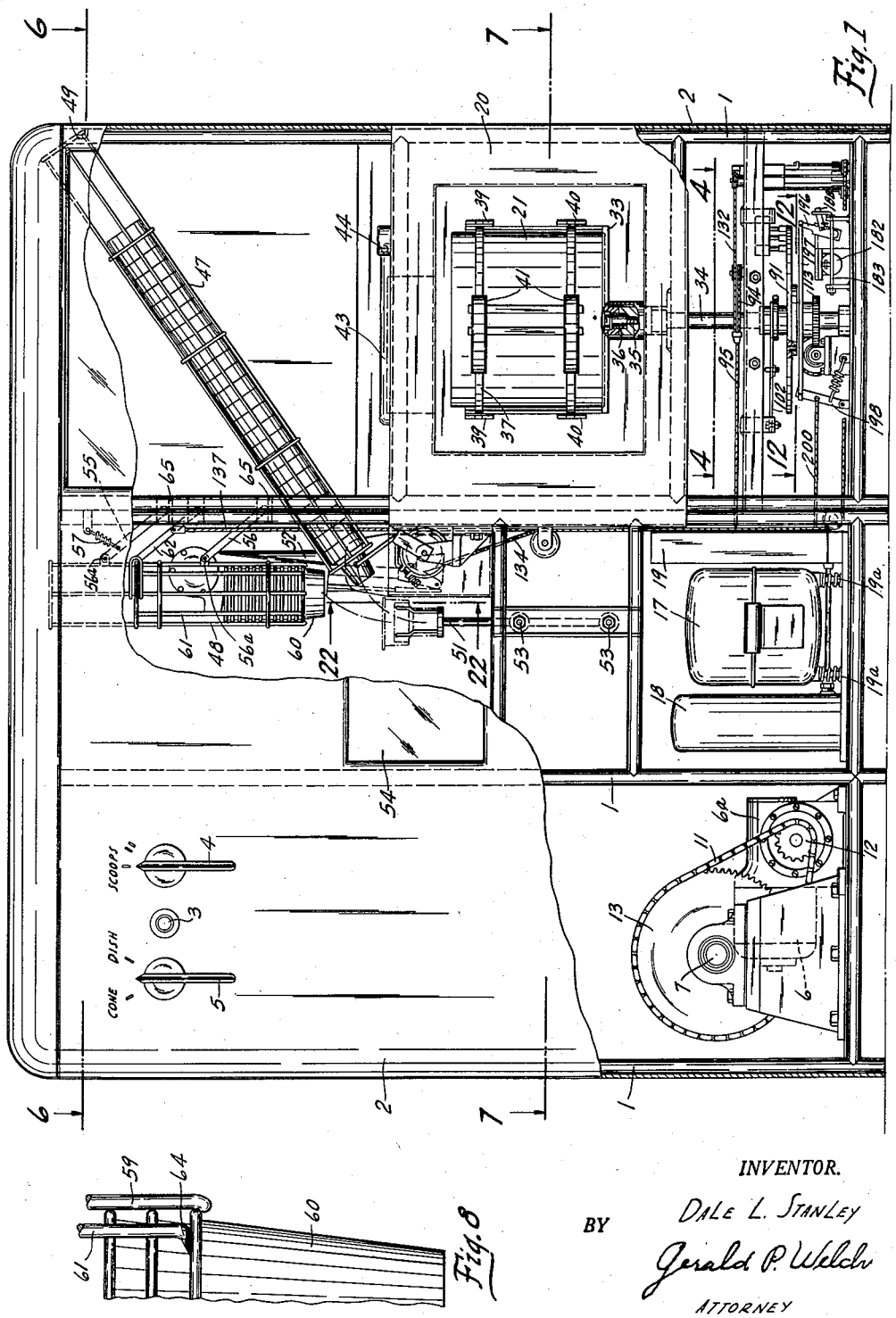
INVENTOR.
DALE L. STANLEY
BY
Gerald P. Welch
ATTORNEY Aug. 18, 1959　　　D. L. STANLEY　　　2,899,988
ICE CREAM DISPENSERS
Filed April 12, 1957　　　　　　　　　　　　　15 Sheets-Sheet 2
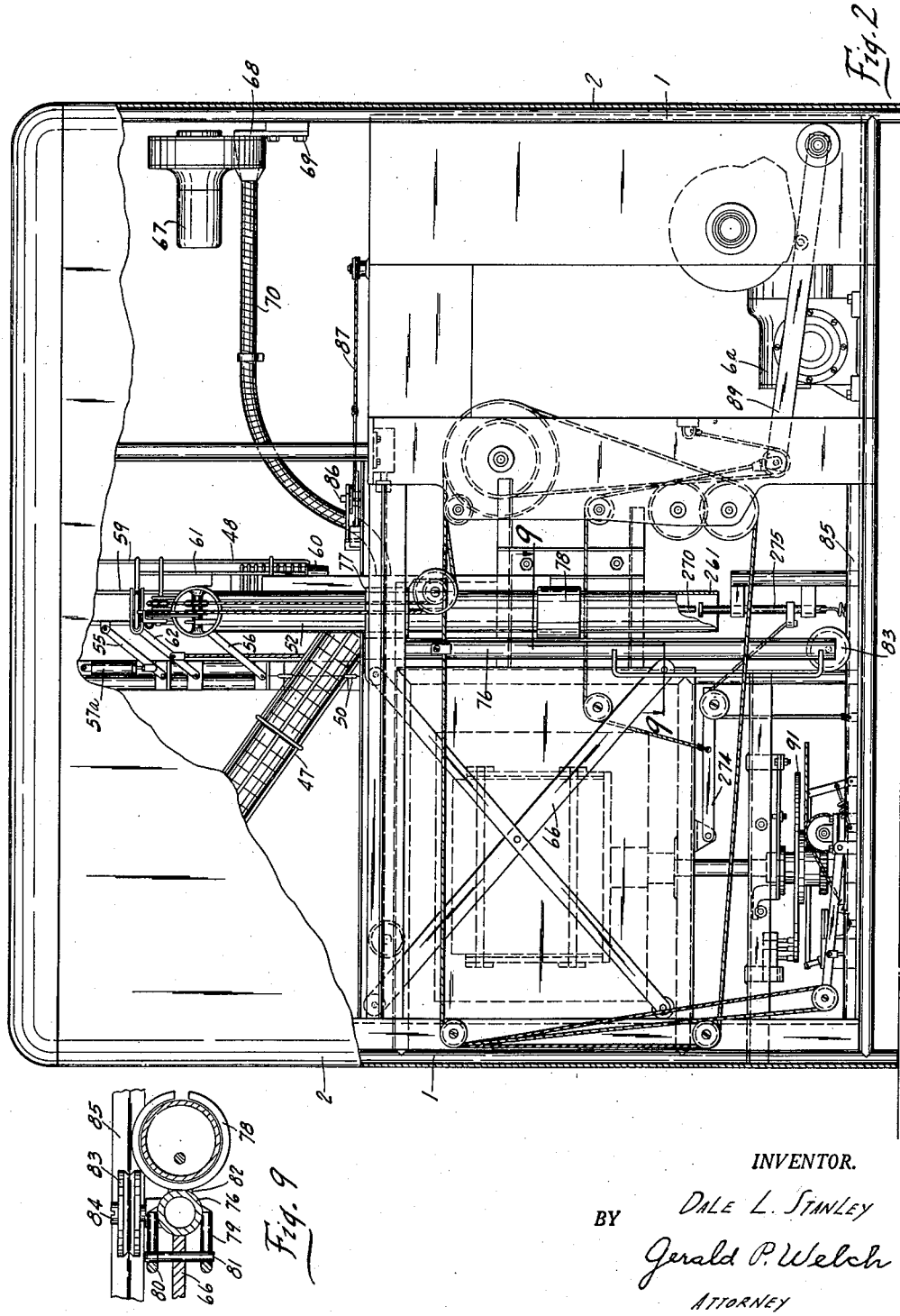
INVENTOR.
DALE L. STANLEY
BY
Gerald P. Welch
ATTORNEY Aug. 18, 1959   D. L. STANLEY   2,899,988
ICE CREAM DISPENSERS
Filed April 12, 1957   15 Sheets-Sheet 3
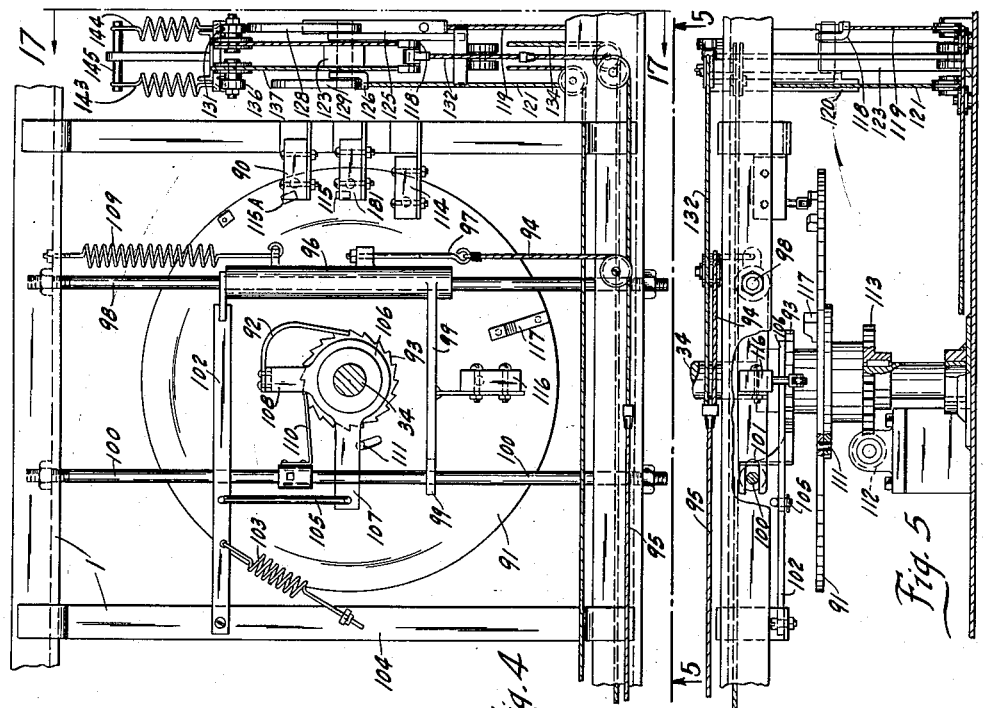
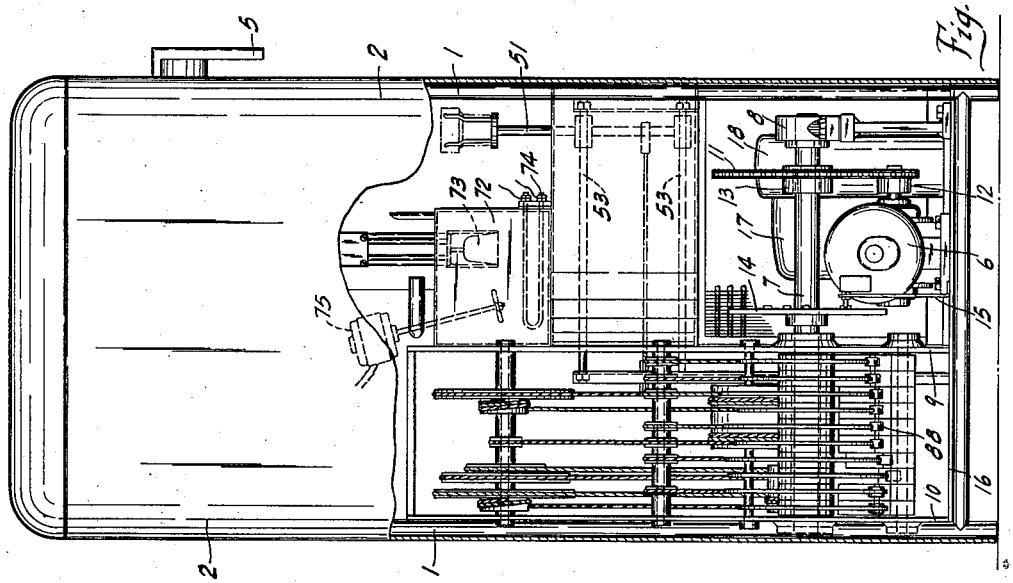
INVENTOR.
DALE L. STANLEY
BY
Gerald P. Welch
ATTORNEY Aug. 18, 1959  D. L. STANLEY  2,899,988
ICE CREAM DISPENSERS
Filed April 12, 1957  15 Sheets-Sheet 4
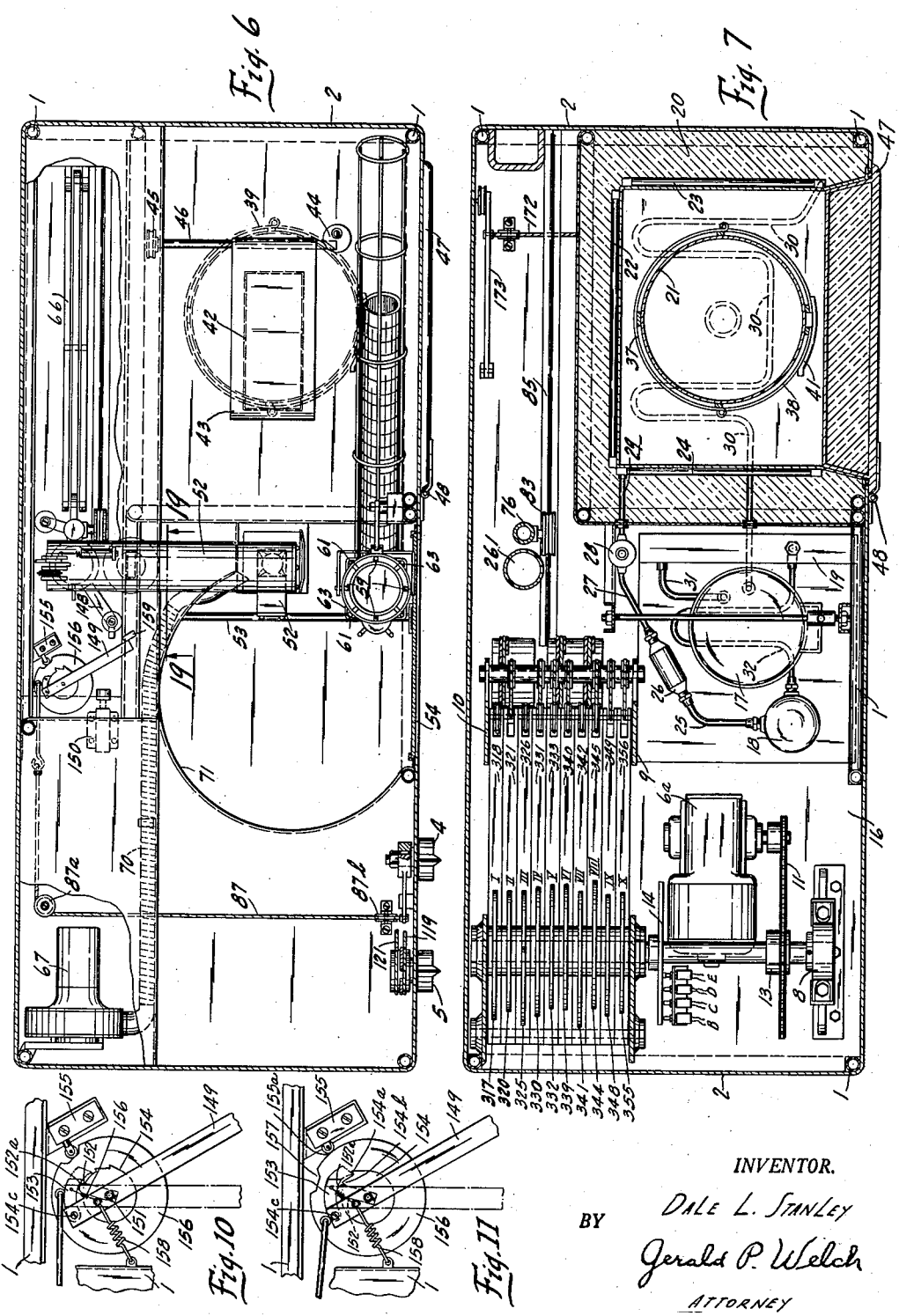
INVENTOR.
DALE L. STANLEY
BY
Gerald P. Welch
ATTORNEY

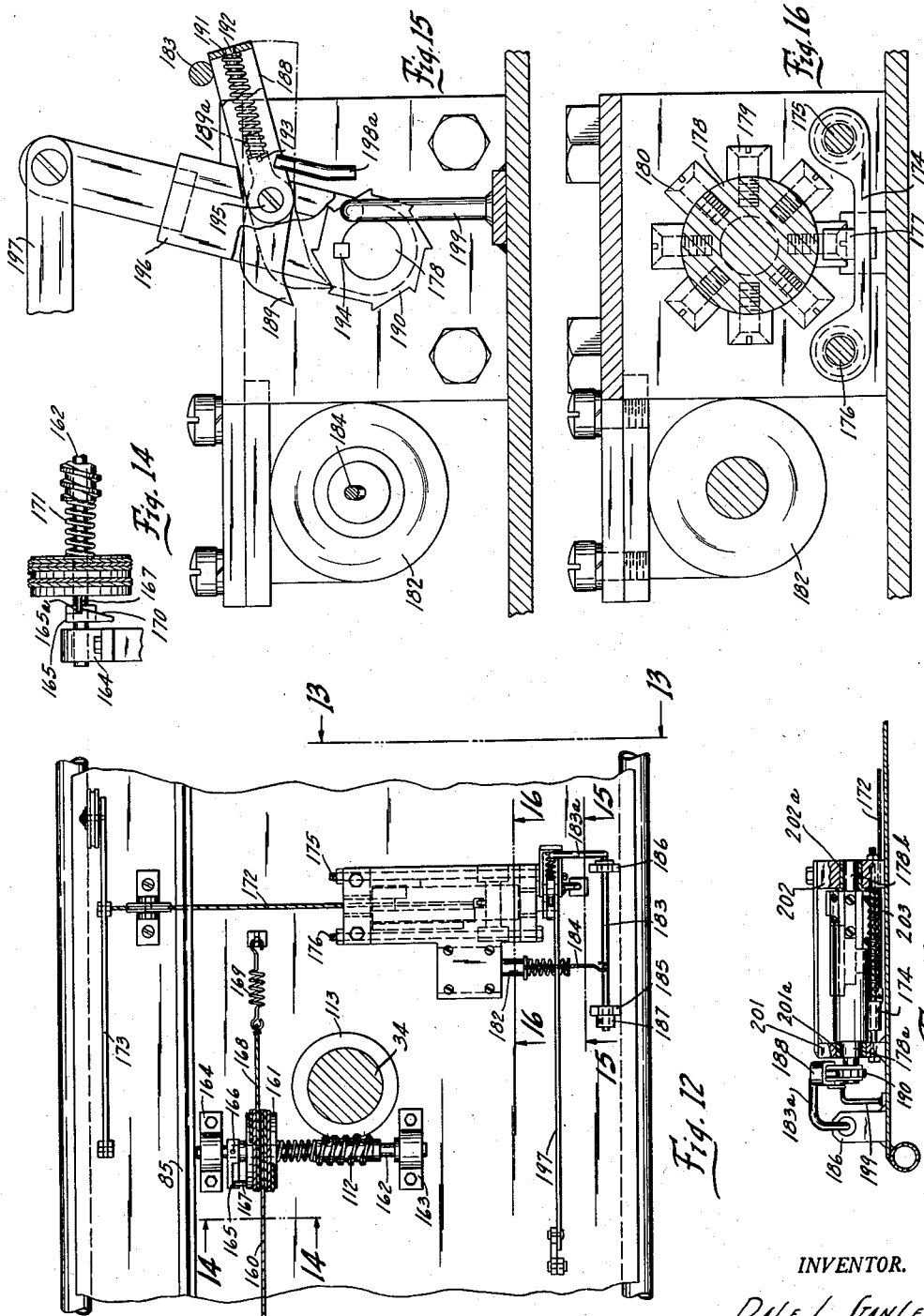

Aug. 18, 1959     D. L. STANLEY     2,899,988
ICE CREAM DISPENSERS
Filed April 12, 1957     15 Sheets-Sheet 6
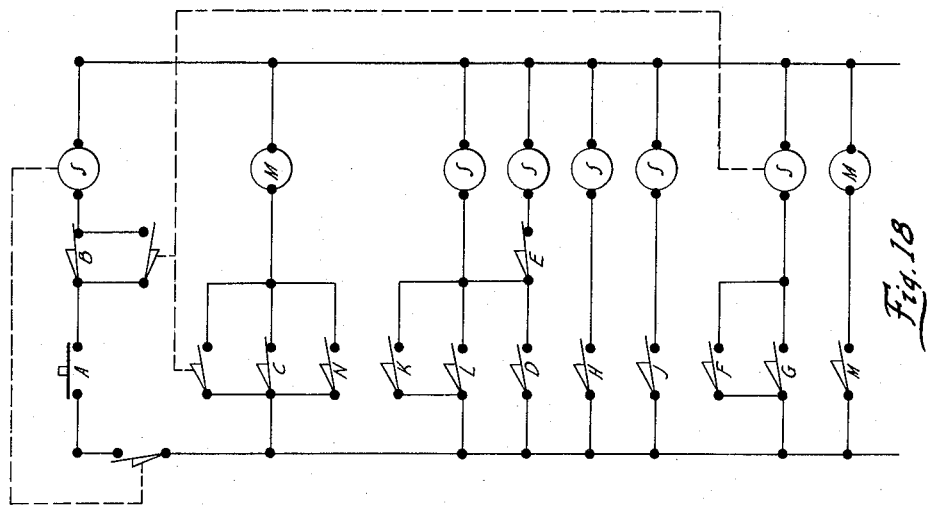
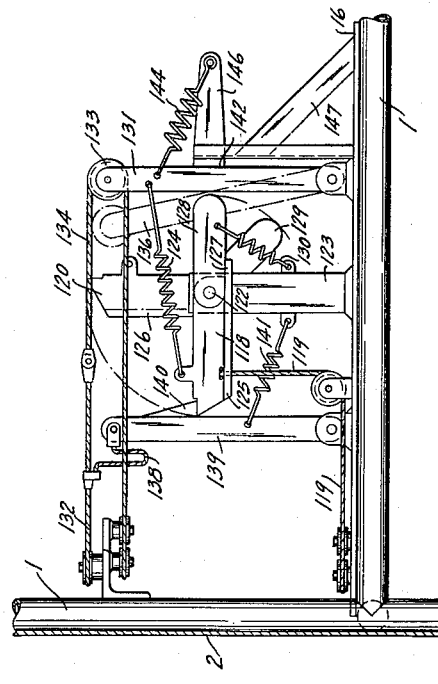
INVENTOR.
DALE L. STANLEY
BY Gerald P. Welch
ATTORNEY Aug. 18, 1959  D. L. STANLEY  2,899,988
ICE CREAM DISPENSERS
Filed April 12, 1957  15 Sheets-Sheet 7
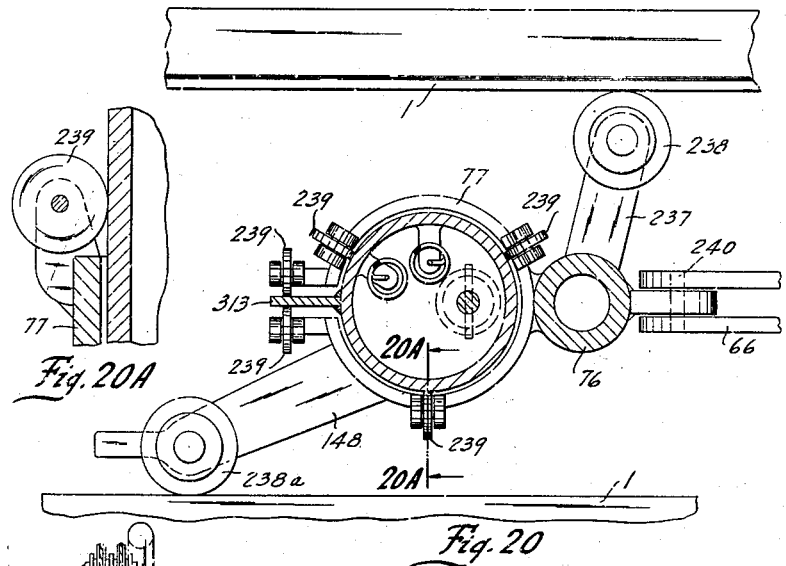
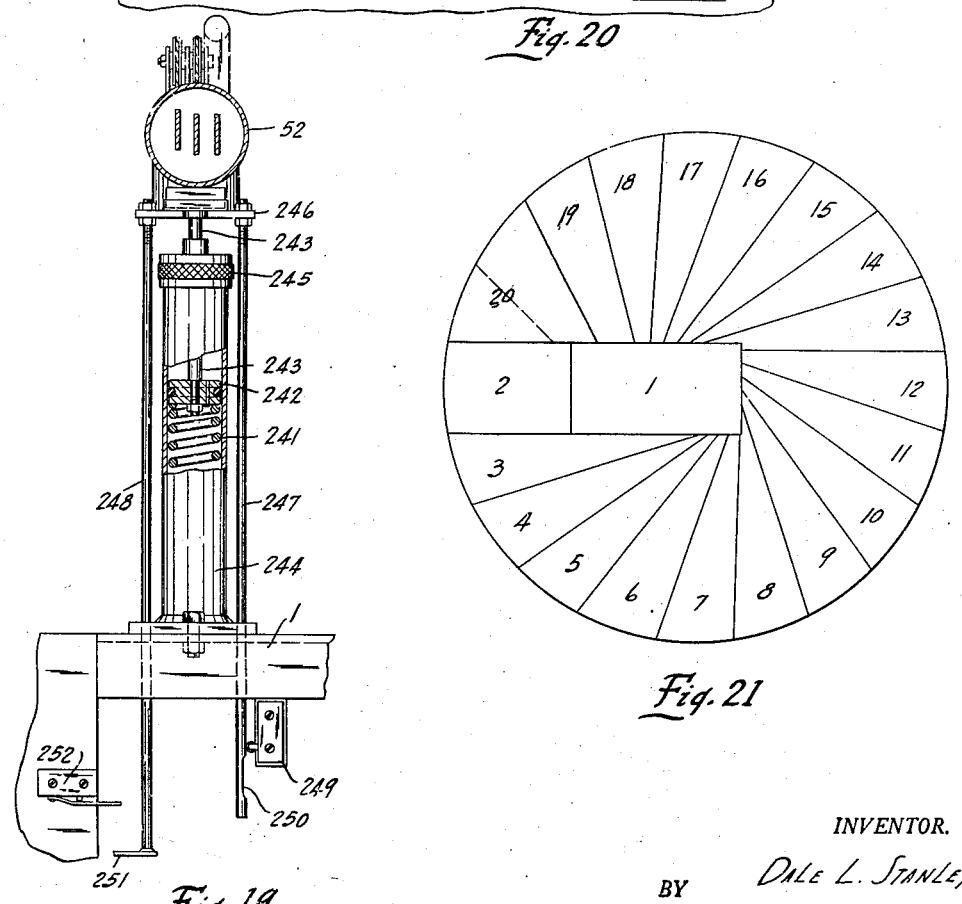
INVENTOR.
Dale L. Stanley
BY Gerald P. Welch
ATTORNEY Aug. 18, 1959  D. L. STANLEY  2,899,988
ICE CREAM DISPENSERS
Filed April 12, 1957  15 Sheets-Sheet 8
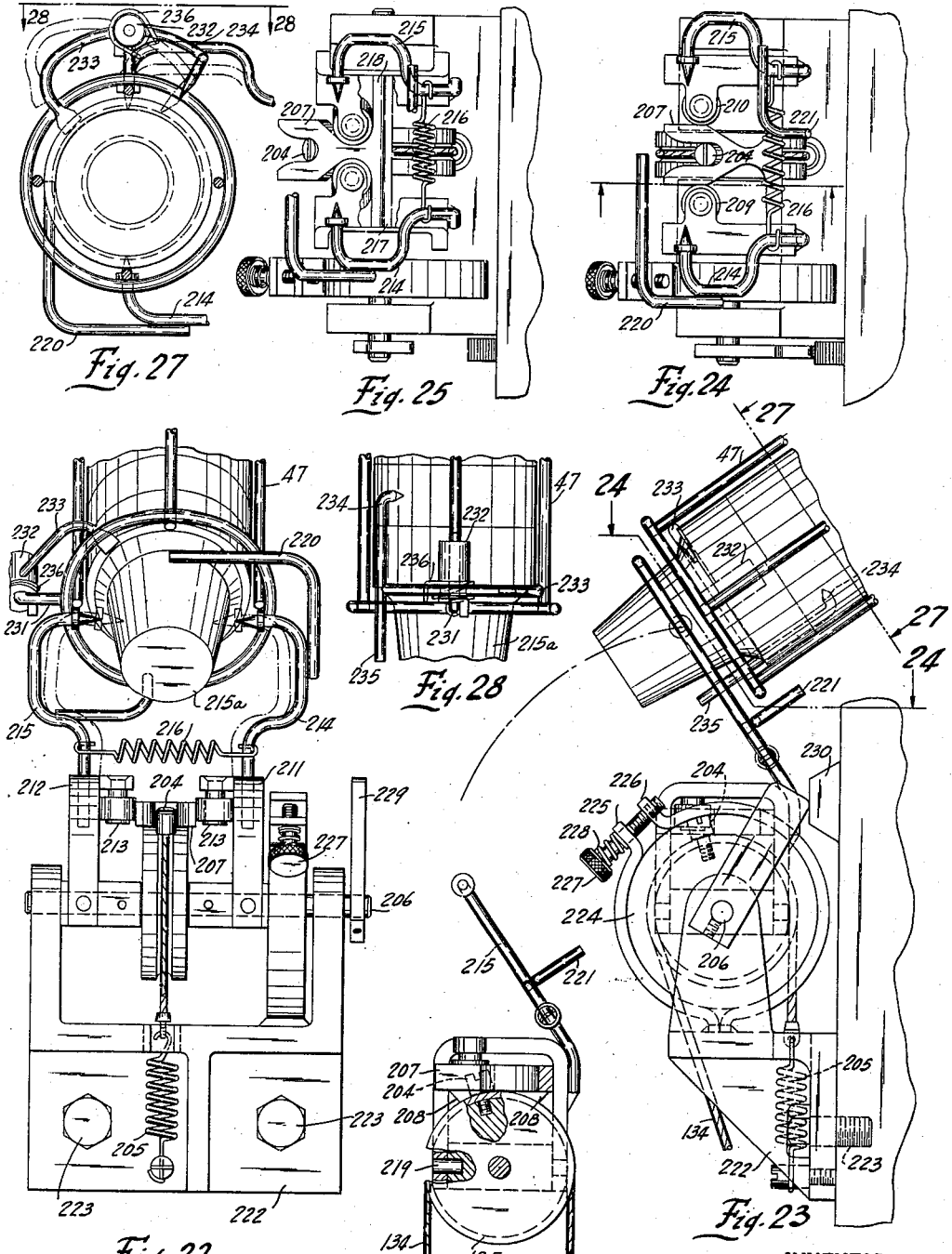
INVENTOR.
BY DALE L. STANLEY
Gerald P. Welch
ATTORNEY Aug. 18, 1959    D. L. STANLEY    2,899,988
ICE CREAM DISPENSERS
Filed April 12, 1957    15 Sheets-Sheet 9
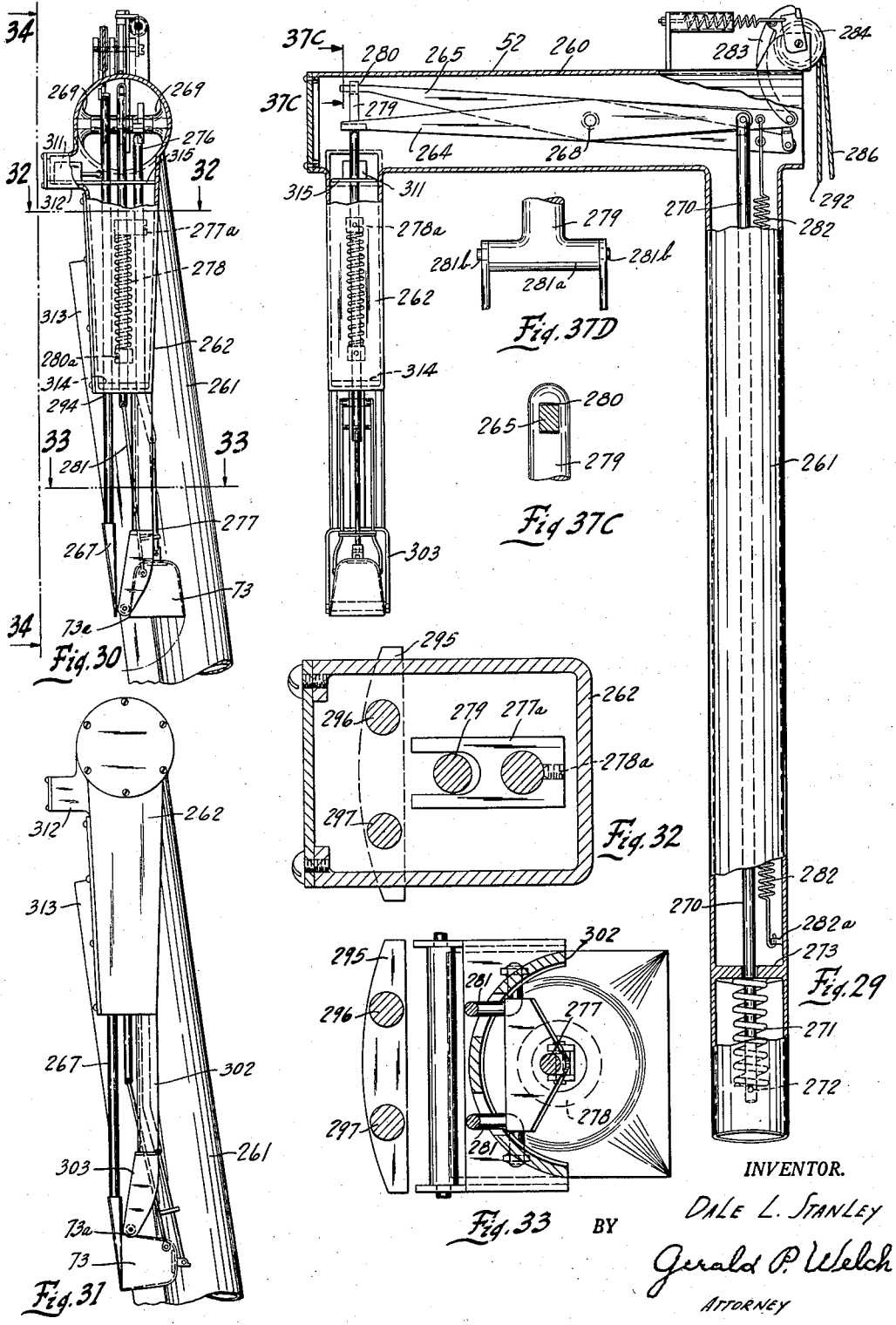
INVENTOR.
DALE L. STANLEY
BY Gerald P. Welch
ATTORNEY Aug. 18, 1959 D. L. STANLEY 2,899,988
ICE CREAM DISPENSERS
Filed April 12, 1957 15 Sheets-Sheet 10
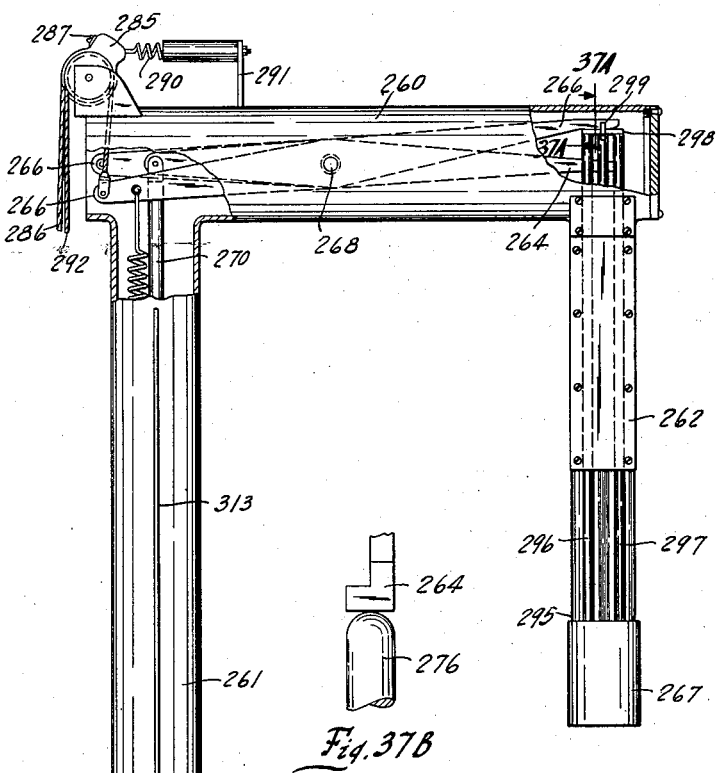
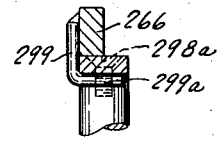
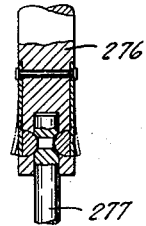
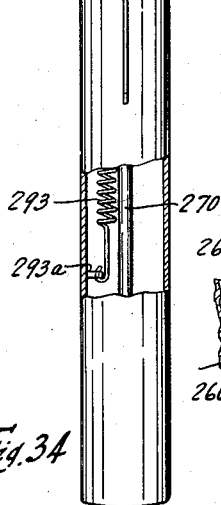
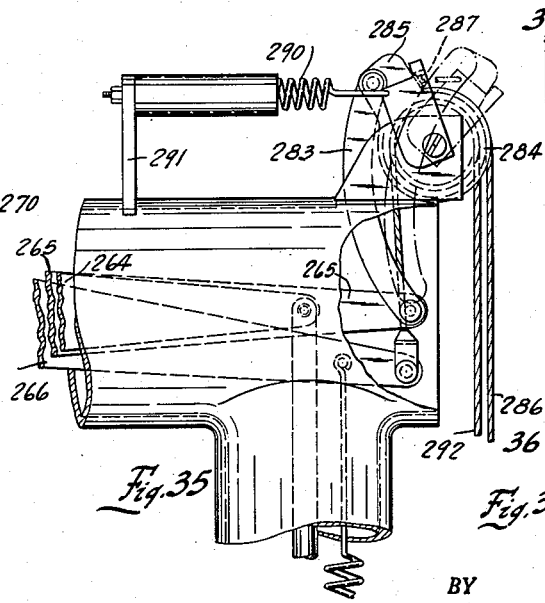
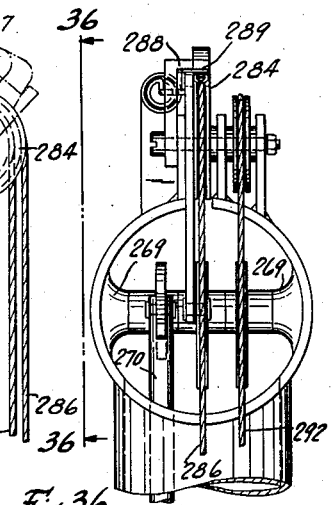
INVENTOR.
BY Dale L. Stanley
Gerald P. Welch
ATTORNEY Aug. 18, 1959  D. L. STANLEY  2,899,988
ICE CREAM DISPENSERS
Filed April 12, 1957  15 Sheets-Sheet 11

INVENTOR.
DALE L. STANLEY
BY
Gerald P. Welch
ATTORNEY

Aug. 18, 1959     D. L. STANLEY     2,899,988
ICE CREAM DISPENSERS

Filed April 12, 1957                            15 Sheets-Sheet 12

INVENTOR.
DALE L. STANLEY
BY
Gerald P. Welch
ATTORNEY

Aug. 18, 1959    D. L. STANLEY    2,899,988
ICE CREAM DISPENSERS
Filed April 12, 1957    15 Sheets-Sheet 13

INVENTOR.
DALE L. STANLEY
BY
Gerald P. Welch
ATTORNEY

Aug. 18, 1959     D. L. STANLEY     2,899,988
ICE CREAM DISPENSERS
Filed April 12, 1957     15 Sheets-Sheet 14

INVENTOR.
Dale L. Stanley
BY
Gerald P. Welch
ATTORNEY

Aug. 18, 1959      D. L. STANLEY      2,899,988
ICE CREAM DISPENSERS

Filed April 12, 1957      15 Sheets-Sheet 15

INVENTOR.
DALE L. STANLEY
BY
Gerald P. Welch
ATTORNEY

United States Patent Office 2,899,988
Patented Aug. 18, 1959

2,899,988
ICE CREAM DISPENSER
Dale L. Stanley, West Allis, Wis.
Application April 12, 1957, Serial No. 652,521
4 Claims. (Cl. 141—90)

This invention relates to improvements in ice cream dispensers, and more particularly to a novel ice cream dispenser of the motor-driven automatic type.

An object of the invention is to provide a machine of the type which will quickly and efficiently dispense ice cream in a cone or a dish according to the choice of the user.

Another object of the invention is to provide a device of the type including a repeat mechanism making it optional to place one or two scoops of ice cream in a dish or cone.

Another object of the invention is to provide a device of the type which will efficiently dispense the ice cream from a conventional container by mechanical means in a thorough manner.

Other and further objects of the invention will appear as the description proceeds, reference being had to the accompanying drawings, in which:

Fig. 1 is a front view in elevation of the machine with the sheet metal housing partially cut away.
Fig. 2 is a similar rear view of the device.
Fig. 3 is a similar end view of the machine.
Fig. 4 is a view taken on line 4—4 of Fig. 1.
Fig. 5 is a view taken on line 5—5 of Fig. 4.
Fig. 6 is a plan view partly in section and partly in elevation taken on line 6—6 of Fig. 1.
Fig. 7 is a view taken on line 7—7 of Fig. 1.
Fig. 8 is a fragmentary view of portions of the cup dispensing mechanism.
Fig. 9 is a view taken on line 9—9 of Fig. 2.
Fig. 10 is a fragmentary plan view of a selector mechanism.
Fig. 11 is a similar view of the selector mechanism in another position.
Fig. 12 is a view taken on line 12—12 of Fig. 1.
Fig. 13 is a view taken on line 13—13 of Fig. 12.
Fig. 14 is a view taken on line 14—14 of Fig. 12.
Fig. 15 is a view taken on line 15—15 of Fig. 12.
Fig. 16 is a view taken on line 16—16 of Fig. 12
Fig. 17 is a view taken on line 17—17 of Fig. 4.
Fig. 18 is a wiring diagram of the machine.
Fig. 19 is a view taken on line 19—19 of Fig. 6.
Fig. 20 is an enlarged fragmentary view of the scoop arm mounting.
Fig. 20a is a view taken on line 20a—20a of Fig. 20.
Fig. 21 is a diagram showing the stroke pattern and indexing of the scoop element in the ice cream container.
Fig. 22 is a view taken on line 22—22 of Fig. 1.
Fig. 23 is an end elevation of Fig. 22.
Fig. 24 is a plan view of Fig. 23.
Fig. 25 is a view of the cone gripping mechanism.
Fig. 26 is a similar view of the mechanism opened.
Fig. 27 is a view taken on line 27—27 of Fig. 23.
Fig. 28 is a view taken on line 28—28 of Fig. 27.
Fig. 29 is a view partly in elevation and partly in section of the scoop arm.
Fig. 30 is a frontal view of a portion of the scoop and knife mechanism.

Figure 39:
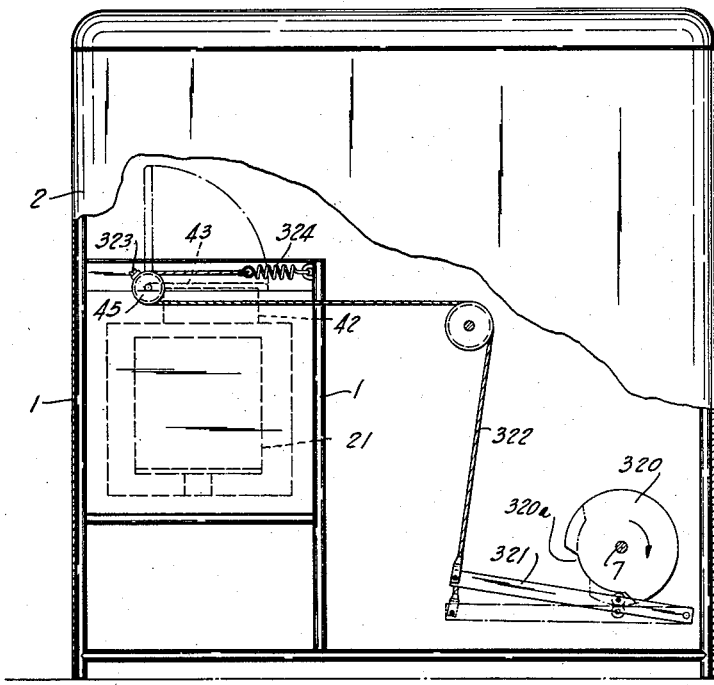
Figure 40:
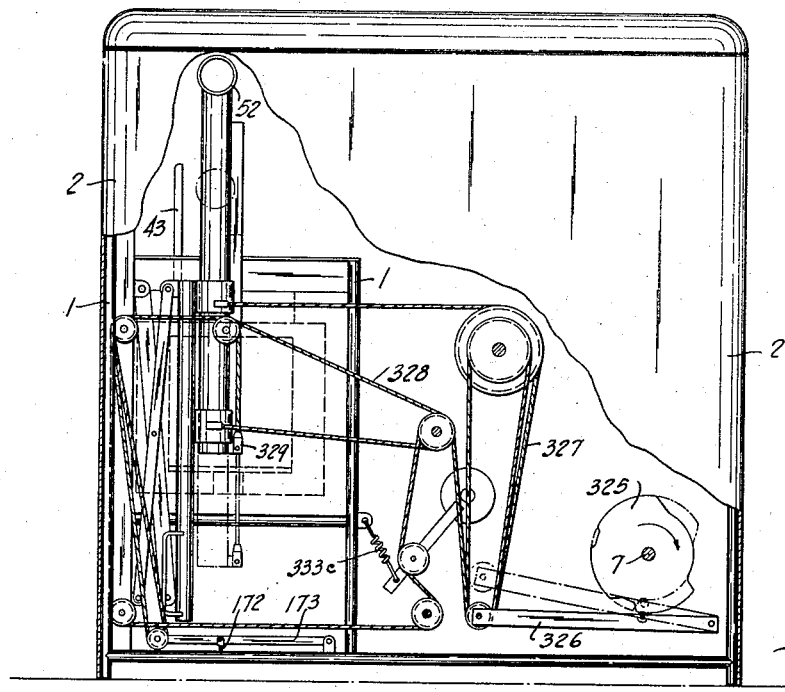
Figure 41:
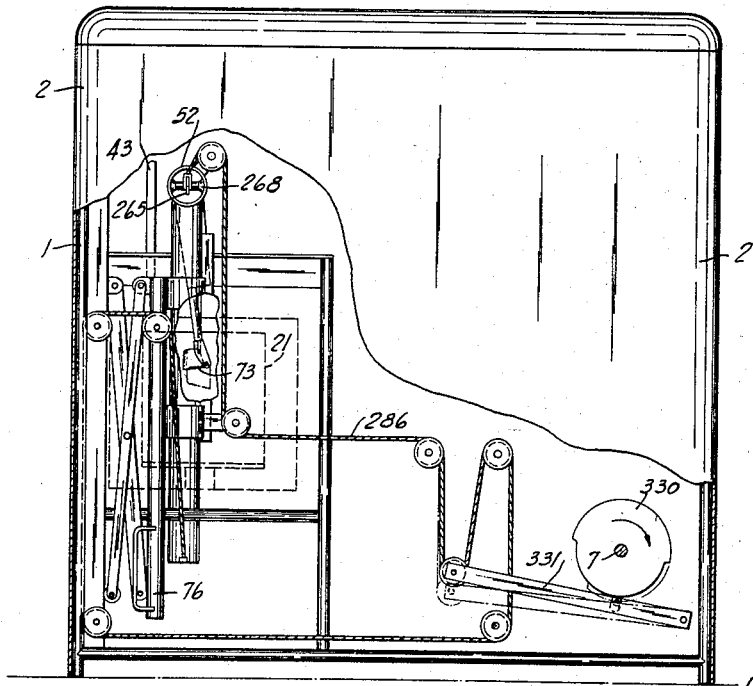
Figure 42:
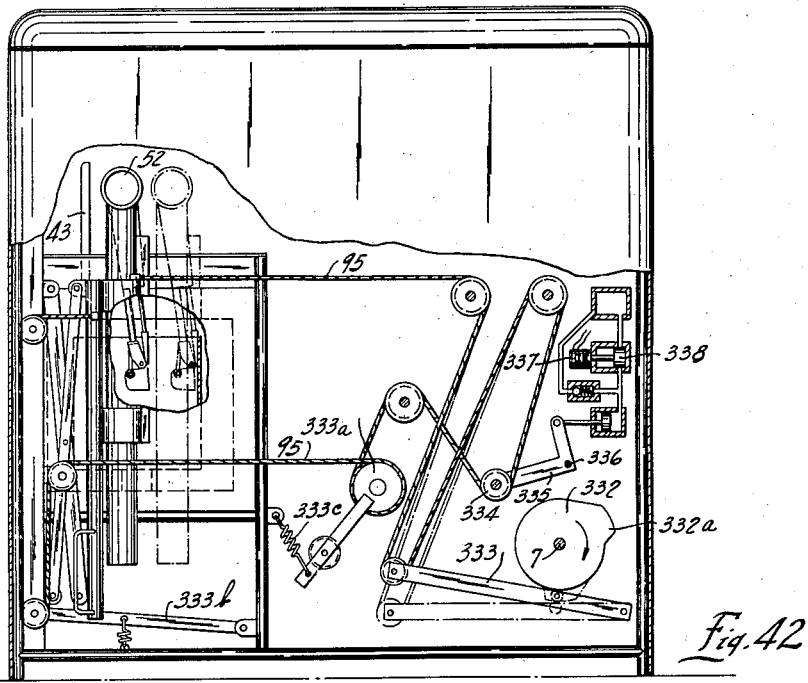
Figure 43:
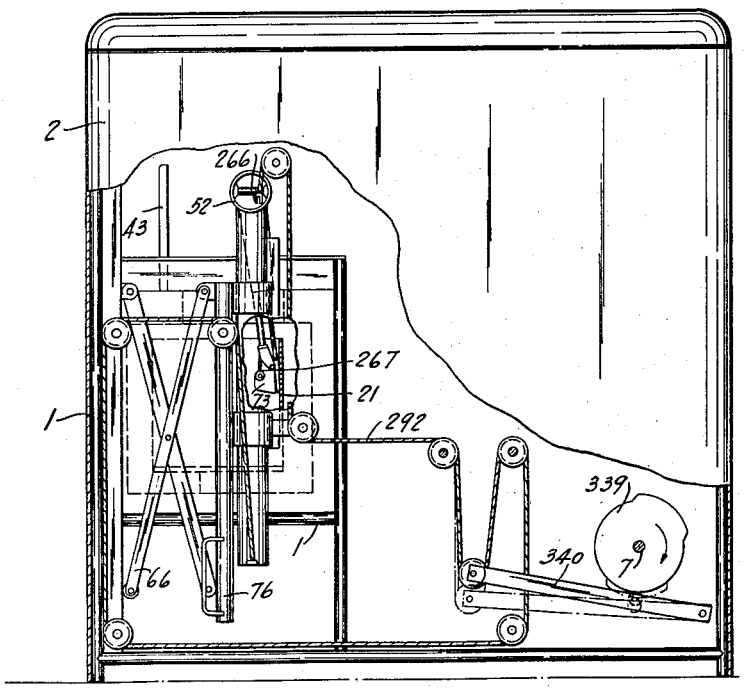
Figure 44:
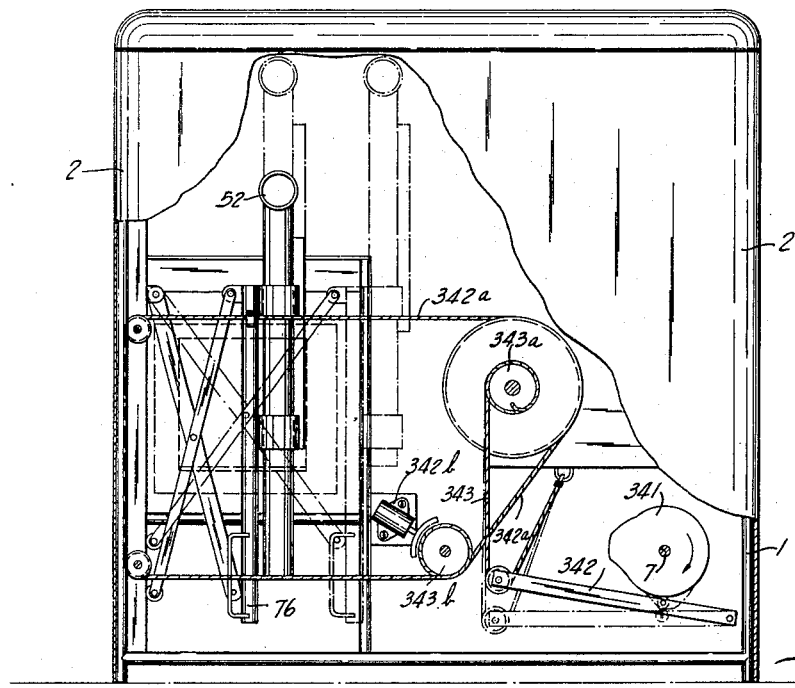
Figure 45:
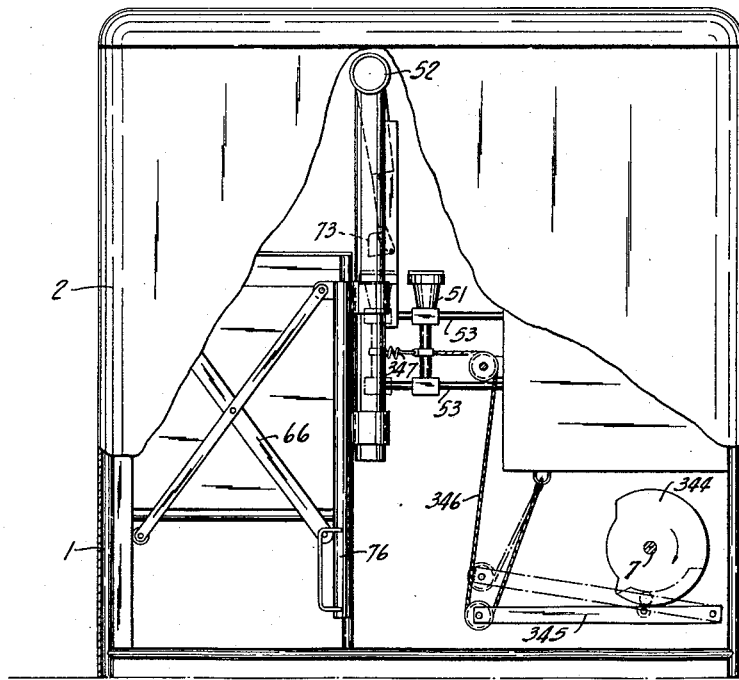
Figure 46:
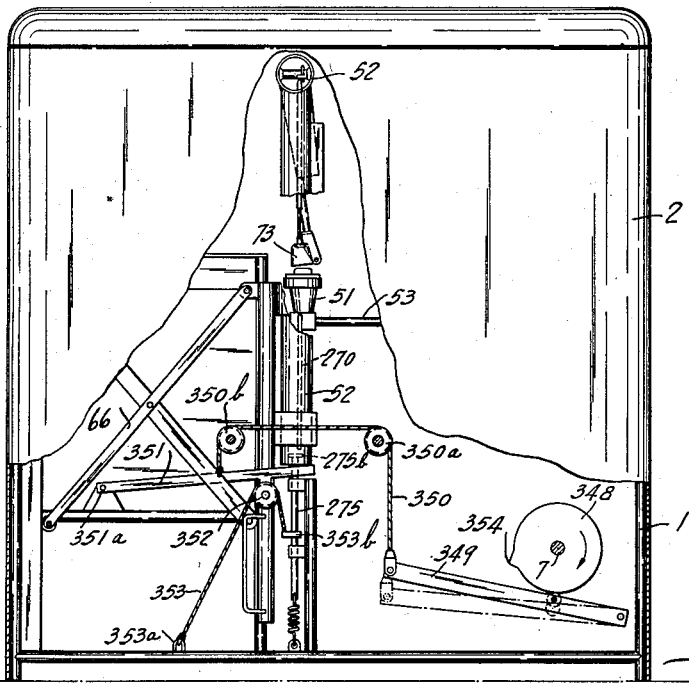
Figure 47:
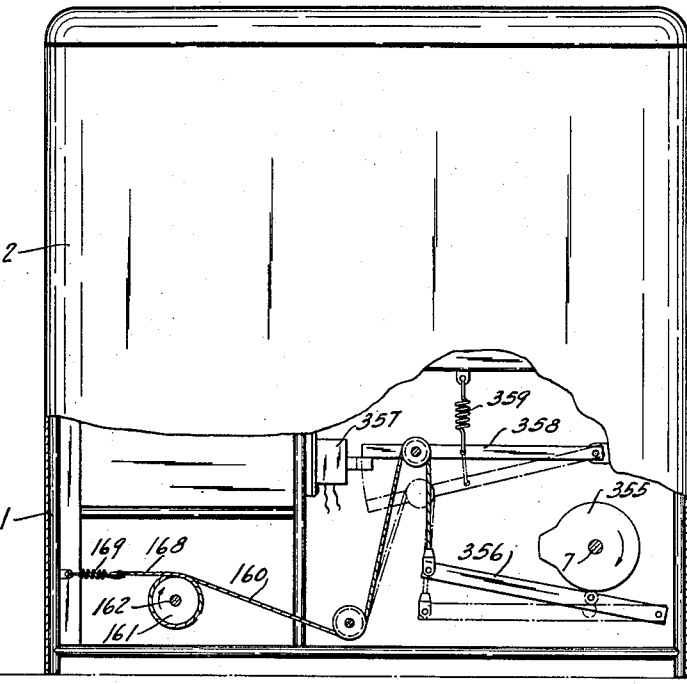

Fig. 31 is a view in elevation showing the completion of the downward knife stroke.
Fig. 32 is a view taken on line 32—32 of Fig. 30.
Fig. 33 is a view taken on line 33—33 of Fig. 30.
Fig. 34 is a view taken on line 34—34 of Fig. 30.
Fig. 35 is a fragmentary view of the scoop actuating cables and grooved wheel with projection.
Fig. 36 is a view on line 36—36 of Fig. 35.
Fig. 37 shows a rod detent construction.
Fig. 37a is a fragmentary view in cross-section of a lever and related parts, taken on the line 37A—37A of Fig. 34.
Fig. 37b is a fragmentary detail view in elevation of the contacting portions of a lever and push rod.
Fig. 37c is a fragmentary view in cross-section taken on the line 37C—37C of Fig. 29.
Fig. 37d is a fragmentary view of a connection between a single operating rod, and a pair of rods.
Fig. 38 is a view of the cam circuit necessary to move an arm from rest position to placement over the ice cream container.
Fig. 39 is a view of the cam circuit for opening door over the freezer compartment.
Fig. 40 is a view of the cam circuit operable to drop an arm into the ice cream container to proper level.
Fig. 41 is a view in elevation of the cam circuit operable to tip the scoop.
Fig. 42 shows the cam circuit for moving an arm radially outwardly within the container to fill the scoop.
Fig. 43 illustrates the cam circuit operable to actuate the cut-off knife on the scoop.
Fig. 44 is a view in elevation of the cam circuit operable to move arm 52 from freezer to dispensing position.
Fig. 45 is a similar view of the cam circuit for moving a cone or dish into position.
Fig. 46 shows the cam circuit operable to dispense ice cream from scoop into dish or cone.
Fig. 47 shows the circuit operable to rotate ice cream container.

Referring more particularly to the drawings, the numeral 1 refers to the framework of the machine, provided with a sheet metal covering 2. A switch button 3 is used to start the machine on a cycle of operation and handle 4 controls the mechanism to dispense one or two scoops of ice cream. Handle 5 controls the mechanism which enables the user to choose between a cone or a dish in dispensing the ice cream.

When button 3 is pushed by the operator, the motor 6 operates the cam shaft 7 which latter is provided with a plurality of cams variously constructed for controlling different operations of the machine. The cam shaft 7 is supported on one end by the pillow block 8 and on the opposite end by the supports 9 and 10. The motor 6 is provided with a gear reducer 6a and the small sprocket 12 connected to the large sprocket wheel 13 fixed on the cam shaft 7 by means of the chain 11. The cam shaft 7 also carries a switch plate 14 to which are attached a plurality of lugs which actuate micro switches at set intervals. The said switches are illustrated on Sheet #4, Fig. 7, being marked B, C, D and E, and their function will be later described. The micro switches are affixed to a plate 15 which is welded to floor plate 16 on frame 1.

In Fig. 1 a refrigeration assembly is illustrated, consisting of a compressor 17, a receiving tank 18 and a condenser 19. The compressor 17 is mounted on springs 19a to dampen vibration. This refrigeration unit conditions the freezer compartment 20 in which the ice cream container or can 21 is kept.

Fig. 7 on Sheet #4 is a plan view of the refrigeration means and the connection to freezer compartment 20. The cold plates 22 back the rear wall of freezer compartment 20, and the cold plates 23 and 24 are attached to the side walls thereof.

The refrigerant passes from receiving tank 18 through line 25 and evaporator 26, through line 27 into expansion valve and line 29 into cold plates 24, 22 and 23 and thence through the looped line 30 to return to the compressor 17. The refrigerant flows in liquid form from the receiving tank 18 to the expansion valve 28 where it turns to gas to absorb heat as it passes through the cold plates 22, 23 and 24. The compressor 17 pumps the gas through line 31 to the condenser 19 where it returns to liquid form. The liquid flows to the receiving tank 18 through line 32 to recommence its cycle.

The conventional ice cream container 21 is supported for rotation on the circular plate 33 horizontally disposed and connected to shaft 34 by means of the bolt 35 and centered by the hollow dowel 36. The shaft 34 is part of the indexing mechanism which will be later explained. The ice cream container 21 is held in place by the releasable circular bands 37 and 38, which are hinged at 39 and 40 and each secured by a quick-opening latch 41. Ice cream containers 21 may be quickly removed and replaced by opening the latches 41 to unfasten the bands 37 and 38.

The freezer compartment 20 is apertured at 42 and provided with a door 43 which is hinged at 44 and opened and closed by means of pulley 45 by means of the shaft 46, as shown in Fig. 6 on Sheet #4. A conventional refrigerator door 47 hinged at 48 permits access for placement and removal of ice cream containers 21. As shown in Fig. 39 on Sheet #11, the freezer door 43 is operated through shaft 46 and pulley 45 by the working of primary cam II.

Fig. 1 also illustrates a cone holder 47 and the dish holder 48. The cone holder 47 is supported by means of a hook 49 and two prongs 50. The cone holder 47 is shown so positioned that the cone dispensing mechanism will deposit one cone in the cone receiver 51. At the proper time the cone receiver 51 is moved into position to receive a scoop or two of ice cream from the scoop on the moveable arm 52. The receiver 51 also serves to receive a dish depending upon which ice cream receptacle is desired to be used. The cone receiver 51 slides on the bars 53 as shown on Sheet #14 in Fig. 45, and is powered by primary cam VIII. When the scoop of ice cream is deposited into the chosen receptacle, the receiver 51 returns to its rest position. The customer may then open transparent door 54 to take the cone or dish containing the ice cream. The dish holder 48 is supported by the angularly disposed bars 55 and 56, one end of each bar being fastened to the dish holder and the other to the frame 1 by means of pins 56a. The bars are free to rotate so that when a dish is chosen the dish holder 48 is rotated through an arc to place it over the receiver 51. A spring 57 returns dish holder 48 to its normal or rest position. An air cylinder 57a is connected to bar 55 to act as a damper or brake against spring 57 during the return movement of dish holder 48.

Fig. 8 on Sheet #1 of the drawings is an enlarged detail view of the dish holder. Rod 59 is one of four constituting the cage portion of the dish holder 48 used to retain a plurality of dish containers 60. The moveable portion of dish holder 48 is comprised of four rods 61, and is connected with arm 62. The rods 61 are slightly bowed and slide through loop 63. The said rods have a slight inward bend at 64 for the purpose of ejecting a dish 60 from the holder rods 59 whereby said dish will drop into the receiver 51. Stops 65 limit the movement of bars 55 and 56, to position dish holder 48 over the cone and dish receiver 51. Further movement of bar 62 actuates rods 61 to eject a dish 60.

Fig. 2 shows the lazy tongs 66 which is employed to move scoop arm 52 from its rest position to placement over the ice cream container 21. Also shown are several cable circuits which are explained in detail on the cable circuit Sheets #11 to #15. Also shown is a blower 67 which is supported on frame 1 by means of a bracket 68 and bolts 69. The discharge port of the blower 67 is connected to a flexible hose 70 which projects into the circular partition 71 and terminates at the scoop wash container 72, as shown in Fig. 3. The wash container 72 contains water to clean scoop 73 after each removal of a scoop of ice cream from the ice cream container 21. The washer container 72 is equipped with an electric heating element 74 to raise the temperature of the cleaning water for the purpose of sanitation, and a small motor driven agitator 75 is intended to prevent the accumulation of sediment, the water being changed by continuous process.

Fig. 2 and Fig. 9 illustrate a vertical hollow bar 76 which is circular in cross-section and carries the scoop arm 52 by means of the circular clamps 77 and 78. One leg of the lazy tongs 66 rides against the bar 76, being held in place by the guide bars 79 and 80 and the pin 81. The clamps 77 and 78 are welded to hollow bar 76 as at 82. At the lower end of hollow bar 76 a grooved wheel 82 is secured thereto by means of a shoulder screw 84 and rides on the angle iron track 85.

A repeat mechanism 86 is shown in Fig. 2 and detailed on Sheet #4 in Figs. 6, 10 and 11, and will be more fully described. The mechanism 86 is connected to selector lever 4 by means of the cable 87, pulleys 87a and 87b being used to change the direction of pull.

In Fig. 3 cam rollers 88 are shown attached to each cam arm 89 which bear against the cam proper. The rotation of the cams transmits motion to the cam arms which with a system of cables function to dispense a cone or dish of ice cream.

Fig. 4 illustrates the mechanism which indexes the ice cream container 21 as each scoop full of ice cream is removed therefrom. A pattern of the successive scoop operations is shown in Fig. 21 on Sheet #7, whereby each layer of ice cream in the container 21 is removed by twenty successive scoops full of ice cream. During the first and second scooping operation the container 21 will not rotate, being stopped by micro switch 90, marked J on the wiring diagram, Fig. 18, Sheet #6. At this time disk 91 is rotated by pawl 92 against ratchet 93. The ratchet 93 and disk 91 are integral on shaft 34. The power to move the mechanism back and forth is supplied through cable 94 which is connected to cable 95 which in turn is connected to the primary cam V which operates to fill scoop 73, shown in Fig. 42, Sheet #13. The cable 94 is connected to arm 96 by means of the connector 97 and arm 96 slides back and forth on rod 98. To prevent rotation of arm 96 around rod 98, a forked projection 99 extends horizontally from arm 96 to engage freely the rod 100. As arm 96 is pulled forwardly by cable 94, arm 102 is maintained in contact with the rear of arm 96 by means of the spring 103, one end of which is fastened to arm 102 and the other to the cross member 104 of frame 1. Arm 102 is fastened to rod 105, whose other end is connected to the extension 107 on plate 106. A pawl 92 is provided which indexes against ratchet 93. Therefore when arm 96 is pulled forward pawl 92 is moved counterclockwise to engage the next tooth on the ratchet 93. Return movement of arm 96 is effected by means of spring 109. The ratchet arrangement is used only for the first scoop action on each layer of ice cream when container 21 associated with shaft 34 is not rotated.

The stop 110 is used to prevent counterclockwise rotation of ratchet 93. The dowel 111 is employed to rotate disk 91 and ratchet 93 when the ice cream container 21 is indexed by means of worm 112 and worm wheel 113. The microswitch 114 (G) is used to repeat the scoop filling operation on the twentieth scoop since two passes are required to fill the scoop at this point of operation as indicated in Fig. 21 of Sheet #7. The micro switch 115 (H) is used to control depth mechanism for the lowering of arm 52 into the container 21. The micro switch 116 (K) is activated by location of bar 117 on disk 91 and controls arm travel for filling the scoop on the first pass inside the container 21.

Further shown in Fig. 4 is the selector mechanism used in the choice of a cone or dish. This will be explained in conjunction with Figs. 17 and 5. Part of the selector mechanism is lever 118 which is connected to selector handle 5, see Sheet #1.

The lever 120 is connected by cable 121 to selector handle 5. When handle 5 is turned to "dish" or "cone," lever 118 or lever 120 is brought into position to control the dispensing of a cone or dish.

Fig. 17 shows the position of lever 118 necessary to dispense a cone to receiver 51. Levers 118 and 120 pivot about a pin 122 which is supported by post 123. Spring 124 acts to maintain levers in normal position until selector handle 5 is manipulated to move either lever 118 or lever 120 into a horizontal position. Levers 118 and 120 have a lateral projection from their bottom edges 125 and 126 extending rearwardly beyond the pivot point. The rearward projections 127 operate to raise lever 128 or lever 129 when lever 118 or lever 120 is pulled into horizontal position. Spring 130 returns levers 128 or 129 to normal position. As shown in Fig. 17, when selector handle 5 is moved to cone dispense position, levers 118 and 128 are pulled into a horizontal position and when this happens, lever 131 is prevented from moving forward. Therefore cable 132 which is connected to cable 95 pulls the latter around pulley 133 which in turn is connected to cable 134 that rotates drum 135 and places a cone in receiver 51. Since levers 120 and 129 are in normal position, lever 136 is allowed to move forward as cable 132 moves, thereby not causing tension on cable 137 which actuates the mechanism for carrying a dish to receiver 51. The opposite occurs when selector handle 5 is moved to the dish dispensing position. Cable 138 is connected at one end to lever 139 and at the other to cable 132. Normally cable 138 is slack. When cable 132 is pulled forwardly by the operation of the scoop filling cam, cable 138 is pulled taut during the last fraction of an inch of travel and pulls lever 139 to release lever 118 or 120 from the catch 140, to allow said levers to return to rest or normal position. The spring 141 serves to return lever 139 to rest position. The levers 131 and 136 are returned to normal position against block 142 by means of springs 143 and 144. The springs 143 and 144 are based on pin 145 supported by extended arm 146 connected to bracket 147 welded to floor plate 16.

Figs. 10 and 11 on Sheet #4 illustrate the repeat mechanism which enables the machine to dispense more than one scoop of ice cream. The mechanism is shown in rest position in Fig. 10, wherein only one scoop operation will occur. When arm 52 returns from its position over the ice cream container 21, arm 148 will strike lever 149 moving it to bumper 150 at which point arm 52 is at the normal position. As show in Fig. 10, arm 149 rotates on shaft 151 to which is fastened a fixed lever 152, which latter has a rounded end 152a to maintain pawl 153 disengaged from ratchet wheel 154. The pawl 153 is fastened freely to arm 149 at 154c by means of screw 155. Pawl 153 is urged against rounded end 152a of lever 152 by means of the spring 156.

When lever 149 is pushed by arm 148 during the travel of scoop arm 52, the pawl 153 will slide around the rounded end 152a of lever 152 until the end touches ratchet wheel 154. As no teeth are encountered in this position, no action results and no repeat operation is effected. The micro switch 155 is normally open (F on wiring diagram), and is connected in parallel with stop switch B on the machine. Fig. 10 illustrates the setting for dispensing of one scoop of ice cream.

When two scoops are desired, Fig. 11 illustrates the position of the parts. To effect this setting, the selector handle 4 is moved to the two scoop marking, indicated in Fig. 1, which pulls cable 87 to rotate disk 156, thus closing micro switch 155 to shunt out switch B to allow the machine to run into a second cycle. Then as arm 149 is pushed by arm 148 during the travel of scoop arm 52, pawl 153 will slide around rounded end 152a of lever 152 to engage a tooth 154a of ratchet wheel 154. The movement of arm 149 will rotate ratchet wheel 154 clockwise to a position in which pawl 153 will engage the second tooth 154b on the next travel stroke of arm 52, and disk 156 is further rotated so that micro switch contact point 155a will transfer from the outer perimeter of disk 156 to a cutout portion 157, and when this occurs, micro switch 155 opens and the shunt is removed from switch B in turn stopping the machine at the end of its cycle. The spring 158 returns arm 149 to its normal position after each travel stroke of arm 52 against stop 159.

Fig. 12 on Sheet #5 illustrates the mechanism for rotating ice cream container 21 after each scoopful of ice cream is removed therefrom. The primary cam X actuates cable 160 which is connected to drum 161. Drum 161 is free to rotate on shaft 162 supported at each end by the bearing pillow blocks 163 and 164. Also mounted on shaft 162 is worm 112 which drives worm wheel 113, which in turn rotates shaft 34 to move ice cream container 21. A notched radially disposed arm 165 is fixed on the shaft 162 by means of pin 166. A pin 167 projects longitudinally from drum 161 to rest in the notch at 165a of arm 165. As the cable 160 is pulled by the action of cam X the drum 161 is rotated one revolution together with shaft 162. While drum 161 is rotating, cable 160 unwinds and cable 168 will wind onto the drum 161 causing tension in spring 169. When one revolution of the shaft 162 is completed, the cable 160 will slack off and the spring 169 will rotate drum 161 in the opposite direction, and the counter rotation of drum 161 will force pin 167 to ride up the tapered surface at 170 of notched arm 165 forcing drum 161 axially on shaft 162 toward spring 171 to compress the same, and this action continues until pin 167 slips back into the notch 165a. The spring 171 maintains contact of pin 167 with the notched arm 165. As the drum 161 counter-rotates, the slack in the cable 160 is taken up preparatory to the next travel cycle of scoop arm 52. Fig. 12 also shows the depth control mechanism, and the same is further illustrated in Figs. 13, 15 and 16. As cable 172 is pulled by the action of lever 173, the carriage 174 is pulled forwardly, sliding on rods 175 and 176. A projection 177 is carried on carriage 174 which strikes each of eight cam lobes 180 in turn. The lobes 180 are fastened to cylinder 178 and are equally spaced thereon and secured by flat head machine screws 179. The lobes differ in length to regulate the depth of the drop of the scoop into ice cream container 21. As the arm 52 travels to the ice cream container 21 twenty consecutive times, one complete layer of ice cream will be removed, and on the twentieth pass the micro switch 181, H on wiring diagram, closes.

Micro switch 181 is normally open, being closed by the contact of the lobe 115a on the disk 91, which operates to energize solenoid 182, which latter is connected to rod 183 by means of connecting element 184. Rod 182 is held in supports 185 and 186. Collar 187 embraces rod 183 to maintain its position. As the solenoid 182 is energized, rod 183 is rotated in the supports 185 and 186, and the angularly disposed end 183a of rod 183 will pull trigger 188 downwardly. As a result, pawl 189 will engage one of the teeth on ratchet wheel 190. Dotted lines in Fig. 15 show position of trigger and pawl when rotation of ratchet wheel 190 is effected. The spring 191 is housed inside of trigger 188 to perform a toggle action when the trigger is forced downwardly.

The spring 191 is retained in position by the pin 192 which is part of trigger 188 and by engagement over the reduced portion 189a of pawl 189. The spring 191 also bears against pin 193 on the pawl 189. The ratchet wheel 190 is fixed to cam cylinder 178 by means of a key 194. The trigger 188 and the pawl 189 pivot on shoulder screw 195. These parts are connected to a lever 196 which in turn is connected to bar 197. The opposite end 197a of bar 197 is connected to a lever 198 which is directly connected to primary cam IX by means of cable 200, which dispenses the ice cream from the scoop. The lever 196 moves back and forth in a free wheeling manner around cam cylinder 178 for nineteen consecutive travel cycles of arm 52, and on the twentieth pass the trigger 188 is pushed downwardly engaging pawl 189 with ratchet wheel 190 thereby rotating cam cylinder 178 to bring into position another cam lobe 180 which allows arm 52 to drop downwardly into the ice cream container sufficiently to remove another layer of ice cream. Also on the twentieth trip as arm 196 is moved, rod 198a projecting from trigger 188 will strike stationary post 199 thereby raising trigger 188 to establish the free wheeling action of arm 196 until the complete layer of ice cream has been removed. Additional detail in Fig. 13 shows the supports 201 and 202 for cam cylinder 178, having bushings 201a and 202a in which the bearing portions 178a and 178b of cylinder 178 rotate. A spring 203 returns carriage 174 to normal position after each stroke of arm 52.

Figs. 22, 23 and 24 illustrate the mechanism employed to move a cone into the receiver 51 from the cone holder rack 47, which is shown holding a supply of cones ready for use. Cable 134 is fastened to drum 135 by means of screw 204. The continuation of cable 134 is illustrated in Fig. 4 on Sheet #3. As the cable 134 is pulled downwardly drum 135 will rotate, putting tension on spring 205. Drum 135 rotates freely on shaft 206 and has a slotted bar 207 welded thereto at 208. Rollers 209 and 210 bear against the sides of slotted bar 207 and are fastened to cradles 211 and 212 by means of pins 213. A pair of bent prongs 214 and 215 are urged together by spring means 216 and are fastened to the cradles 211 and 212. As the drum rotates in a counter-clockwise manner, slotted bar 207 is carried along allowing rollers 209 and 210 to follow the side contours thereof whereby spring 216 pulls prongs 214 and 215 toward each other to engage the lower portion of a cone 215a and hold it securely. The movement of the rollers 209 and 210 is stopped by projections 217 and 218. The drum 135 continues to rotate removing said cone from the holder 47 and depositing it in the cone receiver 51. The cradles 211 and 212 are free to rotate about pins 219 and also about shaft 206. Prong 214 has a finger 220 connected thereto to prevent the cone from swinging out of position due to centrifugal force during its arced movement from cone holder 47 to receiver 51. Prong 215 has a finger 221 affixed thereto to prevent the cone from dropping downwardly during its travel from cone holder 47 to cone receiver 51. Parts 220 and 221 are used to insure that the cone will be properly positioned in the receiver 51 to receive the scoop of ice cream. Shaft 206 is supported by bracket 222 fastened to frame 1 by means of bolts 223. Shaft 206 also carries a fixed wheel 224 embraced by bands 225 and 226 joined by means of a screw 227 held in set position by the spring 228. The bands 225 and 226 function as a brake to retard the return rotation of drum 135. A stop arm 229 is fixed to the shaft 206 and strikes the frame projection 230.

A means for retaining a plurality of cones in the cone holder 47 while the lowermost cone is being removed is illustrated in Figs. 27 and 28. A projecting rod 231 is fastened to cone holder 47 and is bent upwardly to hold a rotatable hollow cylinder 232. A pointed rod 234 is fastened to one side of cylinder 232 and has a downward projection 235 which fits inside of prong 215. A spring 236 is hooked around elements 234 and 231. The normal position for retainer rod 233 is shown in Figs. 27 and 23. In the process of dispensing a cone, prongs 214 and 215 are drawn together by spring 216 as previously described. Prong 215 exerts a pressure against downward projection 235, thereby rotating cylinder 232 to move projection 233 out of its rest position as shown in dotted lines in Fig. 27 and said movement also forces the pointed end of rod 234 into the large end of the cone above the one being removed. This action permits the removal of one cone and retains the balance of the cones in the cone holder 47. When the cycle is completed, pressure on 235 exerted by prong 215 is removed and spring 236 will rotate cylinder 232 back into its normal position.

Fig. 20 illustrates the manner in which arm 52 is held in position during its travel stroke. The lower portion of arm 52 is held in clamps 77 which are fastened to hollow bar 76. An arm 237 is fixed to bar 76 and is provided with a rubber tired wheel 238. A second arm 148 extends at an angle from clamp 77 and is provided with wheel 238A. During the to and fro travel of arm 52, the wheels 238 and 238A ride against portions of the frame 1 to prevent the arm 52 from racking or rotating. A plurality of wheels 239 act as guides when the arm 52 moves up and down. Fig. 20A is a view in section of one of these wheels 239. Lazy tongs 66 is fastened to the hollow bar 76 by means of the pin 240.

Fig. 19 illustrates the mechanism used to control the start and stop of blower 67, which is used to dry off the scoop after being immersed in the wash. Fig. 19 shows the mechanism in its rest position with the scoop being in the wash container 72, as shown in Fig. 3. As the machine is started, arm 52 moves upward, thereby removing the load on spring 241. This in turn will allow piston 242 to travel upwardly, and in so doing rod 243 which is connected to piston 242 also moves upward. Piston 242 is housed in cylinder 244 which has a knurled screw top 245 through which a rod 243 projects. As arm 52 moves upward pulling scoop out of the wash, microswitch 249 which is marked M on wiring diagram, which is normally open, is caused to close by contacting the cutaway portion at 250 of guide rod 247. This action starts blower 67 operating by blowing air against the scoop to dry off moisture retained from its immersion in the wash liquid. Blower 67 will keep operating until the upward travel of guide rod 247 opens switch 249, this being accomplished by the microswitch 249 being forced out of the cut off portion of guide rod 247. The upward movement of guide rod 247 is caused by spring 241. At the opposite end of guide rods 247 and 248 is a cross piece 246 which is also connected to piston rod 243. When the piston 242 is at the end of its travel, the projection 251 at the bottom end of guide rod 248 will contact microswitch 252 which is marked M on the wiring diagram, which starts the machine on its cycle of operation.

Fig. 30 shows the scoop 73 in normal rest position and Fig. 31 is an end view showing the scoop 73 in position for the filling operation. The arm 52 includes an upper horizontal tubular portion 260 and integral therewith is a vertical tubular portion 261 comprising the main body of the arm. At the opposite end of portion 260 is a downwardly projecting rectangular tubular portion 262. Internally of tubular portion 260 are three levers pivoted on pin 268 which is supported by the internal bosses 269 in portion 260. A vertical rod 270 is connected to one end of lever 264 and extends downwardly through tubular portion 261 and terminates near the lower end thereof. A spring 271 which bears against pin 272 and wall 273 maintains lever 264 in rest or normal position. The movement of lever 264 is controlled by primary cam IX as shown in Fig. 46, Sheet #15. As cam IX rotates, the lobe on said cam will strike cam arm to force it downwardly thus pulling lever 274 upwardly imparting motion to rod 275 which strikes the lower end of rod 270 pushing it upwardly to pivot lever 264 about pin 268 and pushing down on rod 276 and rod 277 to plug 278 which serves to eject a scoopful of ice cream from the scoop 73. Plug 278 has a projection 279 to prevent its rearward rotation. Rod 276 has a lug 277a which bears against spring 278 which urges rod 276 against the end of lever 264. The lug 277 is fastened to rod 276 by means of a set screw 278a. The lever 265 which is connected with linkage adapted to tip scoop 73 also pivots on pin 268. One end of lever 265 passes through a hollow portion at 280 of rod 279 which latter extends downwardly through the rectangular tubular portion 262. Rod 279 carries a collar 280a which bears against the opposed spring 278. The rod 279 extends downwardly through rectangular portion 262 and connects with framework 281 consisting of a pair of wire rods, one end thereof being fastened to rod 279 by means of a spacer 281a and pins 281b and the opposite end thereof being attached to the topmost portion of scoop 73. The opposite end of lever 265 is connected with a spring 282, which latter is attached to lug 282a on the inside wall of tubular portion 261, and the same end of the lever 265 has affixed thereto a crescent shaped element 283. A grooved wheel 284 has an outward projection 285 to which the crescent-shaped element 283 is attached.

Lever 265 is activated by primary cam IV as illustrated in Fig. 41 on Sheet #12. Cable 286 is pulled downwardly by cam IV causing grooved wheel 284 to rotate along with the crescent-shaped element 283 which in turn will move lever 265 to tip the scoop 73 as previously explained in reference to Figs. 30 and 31. As the grooved wheel 284 is rotated by the pull of cable 286 attached thereto by means of the collared screw 287, lock piece 288 is also rotated since the latter has a lateral extension 289 which is in contact with projection 285 or part of grooved wheel 284. The downward movement of cable 286 proceeds until the crescent-shaped element 283 is in contact with projection 285 and passes over dead center of grooved wheel 284, thus locking the scoop in its horizontal position when same is being filled with ice cream, as shown by broken lines in Fig. 35.

The spring 290 connects lock element 288 and bracket 291 and will return lock element 288 to normal position by the pulling of crescent element 283 back through dead center position.

Lever 266 also pivots about pin 268 and serves to operate the knife 267 cutting away excess ice cream from the scoop 73. One end of lever 266 is attached to cable 292 which is actuated by primary cam VI as shown in Fig. 43, Sheet #13. The same end of lever 266 is provided with a spring 293, the lower end of which is attached to the lug 293a which is part of portion 261. Knife 267 includes a flat portion 295 with two rods 296 and 297 projecting from its upper end and connected to a cross piece 298 by means of the machine screws 298a. A bent rod 299 is fixed on lever 266 and has a hooked portion 299a engaged with the cross member 298, thus connecting lever 266 with said knife 267.

When cable 292 is pulled by the action of primary cam VI, lever 266 is pivoted about pin 268 to push knife 267 downwardly.

Rectangular tubular portion 262 has a crescent-shaped element 302 depending therefrom which terminates at the lower end with a forked portion 303 which latter supports the leading edge 73a of the scoop 73, to act as a pivot point therefor. The scoop 73 and rod 277 can easily be removed for cleaning. The various levers operate in the following sequence, with lever 265 moving first to tip the scoop 73, lever 266 moving secondly to operate knife 294 to cut off excess ice cream and lastly lever 264 which acts to eject ice cream portion from scoop into cone or dish. A projection 312 on rectangular tubular portion 262 houses a micro switch 311, L on wiring diagram, the function of which is to stop the forward travel of arm 52 within the ice cream container 21 as the scoop is filled with ice cream. The inside of the container 21 will be struck by the knife 267 causing it to pivot slightly at 294, transmitting enough pressure at 312 to close the switch 311. This arrangement is valuable inasmuch as the ice cream containers may differ in size.

The tubular portion 261 has a lateral longitudinally projecting fin 313 which prevents rotation of arm 52 as it is held to a vertical movement by the guide wheels 239 as is shown in Fig. 20. The rectangular tubular portion 262 has a rubber pad 314 within the lower end thereof to prevent the entry of moisture. Within the upper end of tubular portion 262 is an apertured plate 315 acting as a spacer for rods 279, 296 and 297.

The cam and cable circuits are illustrated on Sheets numbered 11 through 15, inclusive. Sheet #11 illustrates the cam and cable circuit operable to move arm 52 from its rest position to placement over the ice cream container 21. The cam 316 revolves clockwise whereby cam lobe 317 will move cam arm 318 downwardly pulling on cable 318a causing it to unwind from small drum 318b synchronously moving cable 319 to move arm 52 to a position suitable for the scooping operation.

Fig. 39 shows the cam and cable circuit operable to open door 43 over the freezer compartment. The cam 320 revolves clockwise forcing cam arm 321 downwardly to pull cable 322 attached to pulley 45 by means of the screw 323. The spring 324 closes the door 43 when cam 320 has revolved far enough for the cam roller 88 to ride in the cut away portion at 320 of the cam 320. The action of the cam 320 in opening freezer door 43 is set so that said door is wide open when the arm 52 approaches its position over the ice cream container 21.

Fig. 40 on Sheet #12 shows the cam and cable circuit necessary to drop arm 52 into the ice cream container 21 to the proper level. The cam 325 revolves clockwise forcing arm 326 downwardly thereby pulling on cable 327.

The arm 52 drops downwardly as shown in dot and dash lines. As arm 52 drops into container 21, the cable 328 being attached to the arm 52 at 329 thereof will be pulled downwardly, thus pulling up on arm 173, transmitting motion to cable 172 which is connected with the depth control mechanism as shown in Fig. 12.

Fig. 41 shows the cam and cable circuit operable to tip the scoop 73 when it is inside of the container 21. The cam 330 revolves clockwise and forces cam arm 331 downwardly thereby pulling cable 286 which is connected to lever 265 pivoting on pin 268 pulling rods 279 and 281 to tip the scoop 73 into a horizontal position.

Fig. 42 on Sheet #13 illustrates the cam and cable circuit employed to move the scoop 73 from a position approximately centrally of the container 21 to the wall thereof in the process of filling the scoop. The cam 332 revolves clockwise whereby lobe 332a forces cam lever 333 downwardly pulling on cable 95 to move arm 52 and scoop 73. The brake 333a holds cable 95 and the upward movement of lever 333b permits slack to facilitate limited movement of the said cable in displacing the arm. Spring 333c locks the brake 333a and downward movement of cable 327 releases it. A pulley 334 in the cable circuit is attached to the angular arm 335 pivoted at 336. When the scoop 73 is filled, the switch 311 energizes the solenoid 337 releasing the holding cylinder 338 allowing arm 52 to absorb the remaining motion of cam 332.

Fig. 43 illustrates the cam and cable circuit used in lowering the knife 267. The cam 339 revolves clockwise forcing cam arm 340 downwardly to pull on cable 292 to move lever 266 to push knife 267 downwardly.

Fig. 44 on Sheet #14 shows the cam and cable circuit employed to move arm 52 from a position over the freezer compartment and container 21 to the placement for dispensing the ice cream from the scoop 73. The cam 341 revolves clockwise to force arm 342 downwardly pulling on cable 343 wound on drum 343a. Brake 343b prevents cable 342a from moving until solenoid 342b releases the brake, whereupon cable 342a returns arm 52 to position for dispensing ice cream from the scoop 73.

Fig. 45 on Sheet #14 shows the cam and cable circuit used to move receiver 51 into position where a scoopful of ice cream will be deposited into a cone or dish held therein. The cam 344 revolves clockwise allowing cam arm 345 to move upwardly to permit slack in the cable 346 in turn allowing spring 347 to move the receiver 51 on the bars 53 to proper placement to receive the ice cream.

Fig. 46 on Sheet #15 shows the cam and cable circuit operable to eject the ice cream from scoop 73. The cam 348 revolves in a clockwise direction to force cam arm 349 downwardly, pulling on cable 350 which passes over the horizontally aligned pulleys 350a and 350b and thence downwardly to connect with the arm 351 pivoted at 351a. A pulley 352 is subjoined to arm 351 adjacent its free end, and a cable 353 is fastened to the frame 1 at 353a, runs over pulley 352 and downwardly to a member 353b on the vertical rod 275. A push plate 275b tops the rod 275 and it will be seen that rotation of cam 348 will impart short upward thrust movements to rod 275 which will move rod 270 upwardly to tilt lever 264 imparting downward movement through rods 276 and 277 to button 278. Lever 351 serves to raise arm 52 to withdraw scoop 73 as button 278 is held.

Fig. 47 shows the cam and cable circuit utilized to turn the ice cream container one-twentieth of a revolution for each scooping operation. The cam 355 revolves clockwise to force the cam arm 356 downwardly to pull cable 160 thereby rotating drum 161, as illustrated in Fig. 12. The position of the mechanism as shown in Fig. 47 is maintained for nineteen consecutive scoops. During pass number one the solenoid 357 is energized to release lever 358, allowing lever 358 to move downwardly whereby drum 161 is not revolved and container 21 remains stationary. This occurs for scoopful number one taken from each layer of ice cream. The spring 359 returns lever 358 to its normal position.

It will be understood that the device is capable of many modifications in structure and design, without departing from the spirit of the invention, within the scope of the appended claims.

Having thus described the invention, what is claimed and desired to be secured by Letters Patent of the United States is:

1. In an ice cream dispenser, a scoop, means for moving said scoop downwardly into a circular ice cream container, means for moving said scoop radially within said container, means for withdrawing the scoop therefrom, means for rotary indexing movement of the container, and means for retaining said scoop at different levels in said container during such action, whereby successive layers of ice cream may be removed from the container.

2. In an ice cream dispenser, a scoop, means for moving said scoop downwardly into a circular ice cream container, means for tilting said scoop, means for moving said scoop radially within said container and means for retaining said scoop at different levels in said container during said action, whereby successive layers of ice cream may be removed from the container, and means for periodic withdrawal of the scoop.

3. In an ice cream dispenser having a motor-driven shaft, a plurality of cams on said shaft, a plurality of pivoted levers, lobes on said cams operable to move said levers, a plurality of cables one each attached to a lever, means operable by the cables to introduce and withdraw means to scoop ice cream from successive layers in a conventional circular container, and means for rotative indexing of said container to permit a plurality of scoops from successive layers of ice cream.

4. In an ice cream dispenser having a motor-driven shaft, a plurality of cams fixed along said shaft, a variety of lobes on said cams, a plurality of pivoted arms movable by the passage of said lobes during rotation of said cams, a plurality of cable circuits operable by said pivoted arms to choose and place one of two types of ice cream receptable, to actuate levers to introduce a scoop element into a circular ice cream container at progressively deeper layer levels, to tilt said scoop horizontally, to move same radially toward the container wall a plurality of successive times for each layer of ice cream, to index said container progressively with the scooping operations, to actuate a lever, vertical push rod and depressible knife to cut excess ice cream from the front of said scoop, to withdraw said scoop from the container and place it over said chosen receptacle, to actuate lever and push rod means for dispensing the ice cream into said receptacle.

References Cited in the file of this patent

UNITED STATES PATENTS

| | | |
|---|---|---|
| 2,317,006 | Weightman et al. | Apr. 20, 1943 |
| 2,546,501 | Hamilton | Mar. 27, 1951 |
| 2,580,257 | Lacchella | Dec. 25, 1951 |
| 2,621,838 | Price | Dec. 16, 1952 |
| 2,744,672 | Crist | May 8, 1956 |